March 16, 1965  A. G. DEAN  3,173,274
RAPID TRANSIT CAR AIR CONDITIONING SYSTEM
Filed Sept. 5, 1963  2 Sheets-Sheet 1

INVENTOR.
ALBERT G. DEAN
BY
Douglas R. McKechnie
ATTORNEY

March 16, 1965  A. G. DEAN  3,173,274
RAPID TRANSIT CAR AIR CONDITIONING SYSTEM
Filed Sept. 5, 1963  2 Sheets-Sheet 2

INVENTOR.
ALBERT G. DEAN
BY
Douglas R. McKechnie
ATTORNEY

United States Patent Office 3,173,274
Patented Mar. 16, 1965

3,173,274
RAPID TRANSIT CAR AIR CONDITIONING SYSTEM
Albert G. Dean, Narberth, Pa., assignor to The Budd Company, Philadelphia, Pa., a corporation of Pennsylvania
Filed Sept. 5, 1963, Ser. No. 306,786
6 Claims. (Cl. 62—244)

This invention relates to an air conditioning system for conditioning the air in a rapid transit car, and more particularly, to a system for cooling the air.

To cool the air in a rapid transit car, it is customary to use mechanical refrigeration apparatus which operates on a vapor compression cycle. The apparatus circulates a refrigerant through a closed system having the usual evaporator-condenser-compressor. In the past, it was also customary to arrange these elements into two general types of systems. The first type is one where the refrigeration apparatus is built as a unit or in a central location and the conditioned air is distributed throughout the car by a relatively elaborate duct system. The second type of system employs a compressor-condenser unit and a plurality of remote evaporators located throughout the car. The first type is disadvantageous because the equipment is large and, when it is mounted in the car, it occupies space which otherwise could be used for seats, and both types are disadvantageous because they require conduits, either refrigerant lines or air ducts, to be run throughout the car.

Accordingly, one of the objects of the invention is to provide a new and improved air conditioning system for a rapid transit car.

Another object is to provide a rapid transit car air conditioning system that eliminates the need for conduits to be run throughout the car.

A further object is to provide a relatively compact air conditioning system having air conditioning units that, although they are located to occupy the space which could be used by standees, they do not interfere with maximum utilization of floor space for seats.

Still another object is to provide an air conditioning system having a plurality of self contained air conditioning units for delivering cooled air to the car interior.

Other objects and advantages will be apparent from the following description taken in connection with the accompanying drawings wherein.

Figure 1:
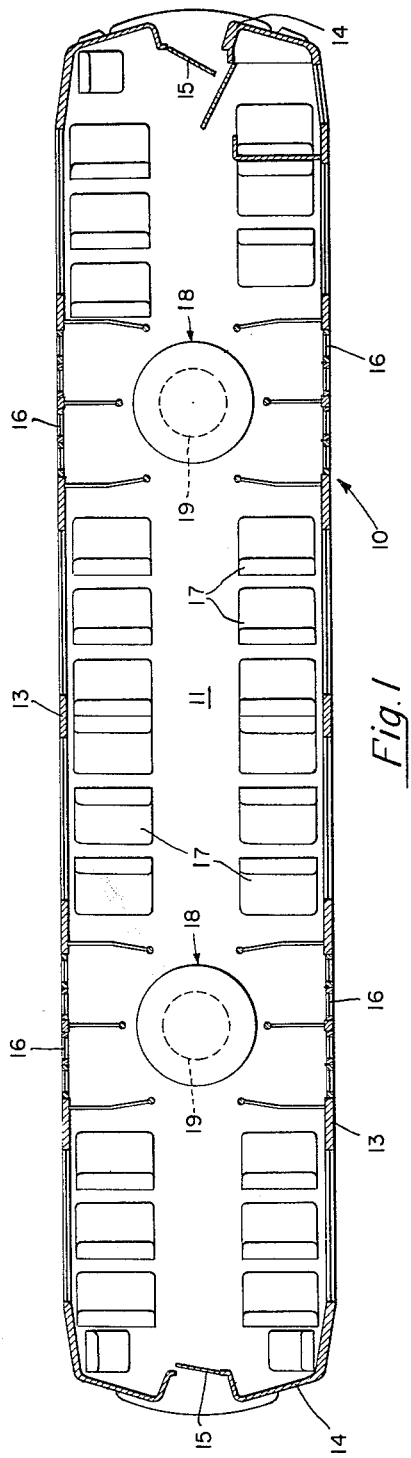
FIG. 1 is a floor plan of a rapid transit car embodying the invention.
Figure 2:
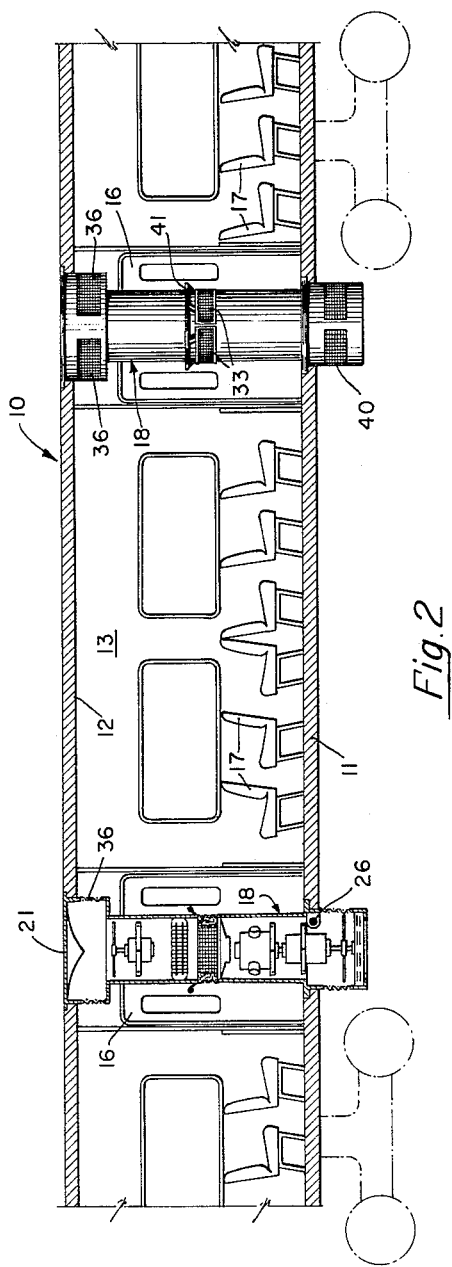
FIG. 2 is a longitudinal, vertical sectional view through the car of FIG. 1.

Referring now to the drawings, there is illustrated a rapid transit car 10 which, except for the air conditioning system, is of conventional construction. Car 10 comprises a car body having floor 11, a roof having a ceiling 12, and a pair of sidewalls 13 and a pair of endwalls 14 extending between the floor and the roof and enclosing the car. Endwalls 14 are provided with end doors 15 that open longitudinally to permit the longitudinal movement of passengers from and into the car, and sidewalls 13 are provided with side opening doors 16 through which passengers are unloaded onto platforms located on either side of the car.

Each door 16 is located directly opposite to a door 16 in the opposite side wall, and car 10 further includes a plurality of seats 17 arranged, as shown in FIG. 1, longitudinally spaced from the door along the side walls so as to provide a floor space between the doors that can accommodate standees and an aisle extending longitudinally along the center of the floor. Located in each such floor space in the car is an air conditioning unit 18.

Each air conditioning unit 18 is mounted on the car body and is lowered into place through the roof during the final assembly of the car. Each unit 18 comprises a vertical, cylindrical, tubular column or casing 19 which extends upwardly from a lower end located beneath the floor, through the floor, the car interior and the ceiling and terminates at its upper end in the roof. The upper end of the casing is closed by an end wall 21 whereas the lower end is open and forms a cooling air outlet 22.

Figures 3, 4:
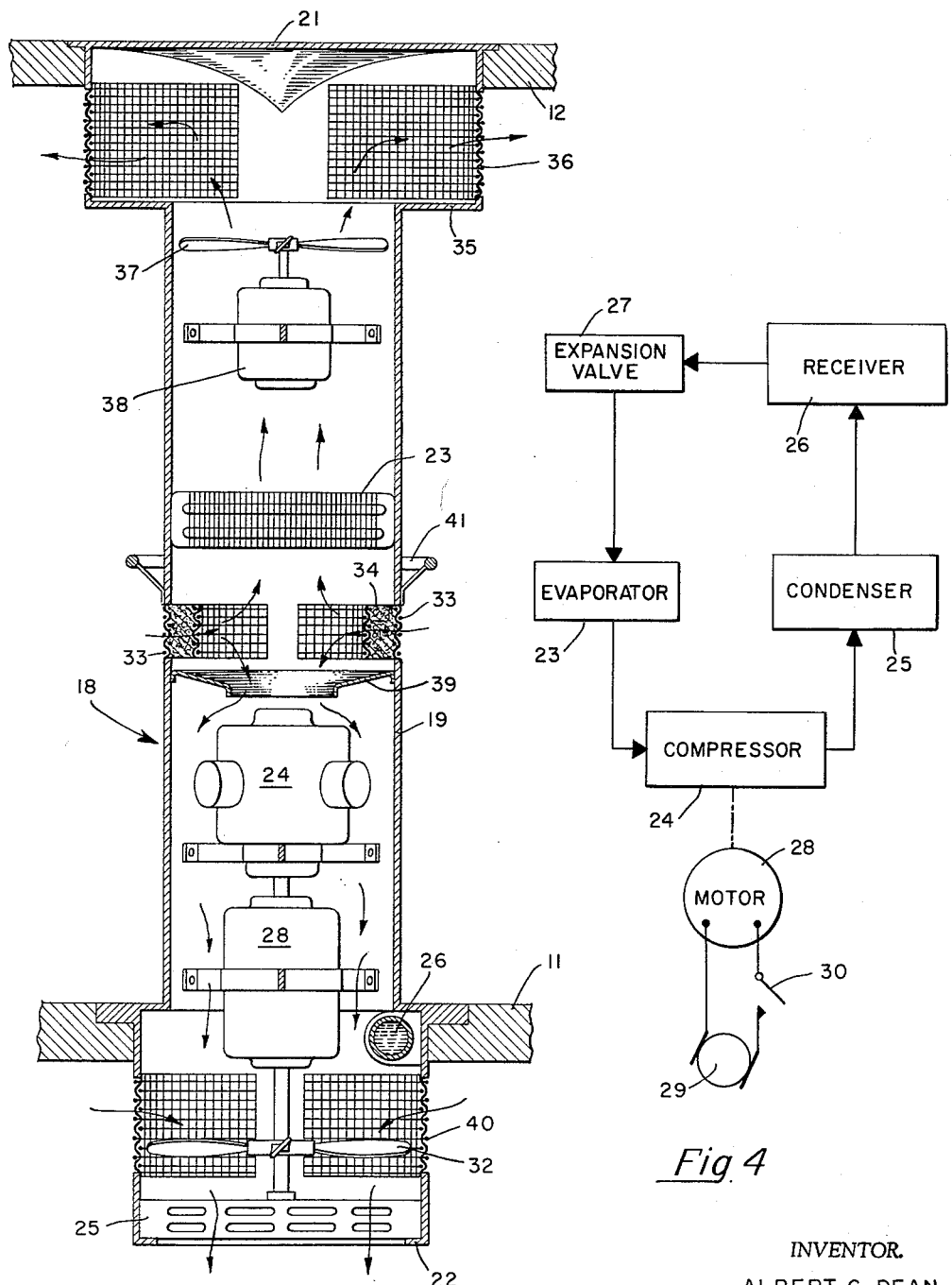
FIG. 3 is a longitudinal vertical sectional view of a detail shown in FIGS. 1 and 2.
FIG. 4 is a schematic diagram of a refrigeration system employed in the invention.

Mounted in casing 19 is a vapor compression cycle type of mechanical refrigerating apparatus that comprises a closed refrigerant circulating system including an evaporator 23, a compressor 24, a condenser 25, a receiver 26 and an expansion valve 27. Compressor 24 is driven by an electrical motor 28 operated by current from a power source 29 under the control of a switch 30 that can be either manually or thermostatically actuated. As best seen in FIG. 3, condenser 25 is mounted in the lower end of casing 19 and covers outlet 22. Immediately above condenser 25, there is located a radial blade fan or blower 32 driven by motor 28 which is mounted thereabove approximately at floor level. Compressor 24 is mounted above motor 28.

Casing 19 is provided with a pair of semi-circular screened inlets 33 covered by filters 34, at a point approximately half way between the floor and ceiling, and evaporator 23 is mounted above these inlets. The upper end of casing 19 is of an enlarged diameter to form a distribution bulkhead 35 having a pair of semi-circular screened outlets 36 which distribute the air that flows therethrough generally longitudinally along the ceiling. Between bulkhead 35 and evaporator 23 is mounted a radial blade type fan 37 driven by a motor 38 so as to draw air in from the interior of the car through inlets 33 and filters 34 and through evaporator 23 and force such air through outlets 36 into the car, the evaporator being operative to cool such air as it passes through the evaporator.

Disposed between inlets 33 and compressor 24 is an annular baffle 39 having a central opening which permits a portion of the air admitted to the casing through inlets 33 to be drawn downwardly over compresser 24 and motor 28 by fan 32 so as to cool these elements and also exhaust air from the car interior, the exhaust air being made up by fresh air through open windows or doors or through suitable inlets. Preferably, evaporator 23 is arranged so that any water condensed thereon from the air passing thereby falls downwardly through baffle 39 onto compressor 24 for evaporation thereby. If desired, the casing can be insulated to deaden the compressor noise and to retard the flow of heat from the compressor.

Beneath floor 11, casing 19 is provided with a pair of semi-circular screened inlets 40 through which cooling air flows from beneath the car as a result of the pumping action of fan 32. The primary condenser cooling air is drawn in through inlets 40 and is mixed with the air passing through baffle 39 prior to the passage of such air through from 32 and condenser 25.

Bulkhead 35 is at a height sufficiently far above the floor so that a passenger or standee will not hit his head against it. Approximately half way up the casing and immediately above inlets 33 there is provided a circular handrail 41, that standees can grasp. The diameter of the middle portion of casing 19 is sufficiently small in comparison to the width of the car so that passengers can freely move past it, the diameter being substantially uniform and preferably no greater than 20 inches so as to occupy a space approximating that which would be occupied by a single standee.

While only a single embodiment has been illustrated, it will be apparent to those skilled in the art that changes can be made in the details and arrangement of parts without departing from the scope of the invention as defined in the appended claims.

What is claimed is:

1. In a railway car, the combination comprising: a car body having a floor and a roof; and an air conditioning unit mounted on said car body and comprising a tubular casing extending upwardly from beneath said floor through the interior of said body and terminating at said roof; a mechanical refrigeration apparatus mounted in said casing and comprising an evaporator located above said floor and a condenser located beneath said floor; said casing having a condenser cooling air inlet and a condenser cooling air outlet; said casing further having an inlet for air-to-be-conditioned and an outlet for conditioned air communicating with said car interior; means for pumping condenser cooling air over said condenser; and means for pumping air-to-be-conditioned through said evaporator and out said conditioned air outlet.

2. In a rapid transit car, the combination comprising: a car body having a floor, a ceiling and sidewalls extending between said floor and ceiling, said sidewalls including at least a pair of opposed, side-opening doors; a plurality of seats mounted on said floor so as to define adjacent to said doors a floor space adapted to accommodate standees; and an air conditioning unit mounted on said car body and comprising a tubular casing extending vertically through the interior of said car in the center of said floor space, said casing being of a size that takes up the floor space required for a single standee to permit standees to stand around it, mechanical refrigeration apparatus mounted in said casing for refrigerating air-to-be-conditioned, and means mounted in said casing for pumping air-to-be-conditioned through said casing and said refrigeration apparatus and into the car interior.

3. The combination of claim 2 and further including a circular handrail mounted on said casing in concentric relationship thereto, said handrail extending outwardly from said casing and providing a hand grip for nearby standees.

4. In a rapid transit car, the combination comprising: a car body including a floor and a roof; and an air conditioning unit mounted on said car body and comprising a tubular casing extending upwardly from beneath said floor and terminating at said roof, said casing having a first inlet and a first outlet located beneath said floor, a second inlet and a second outlet communicating with the car interior, first fan means arranged to pump air through said casing from said first inlet to said first outlet, second fan means arranged to pump air through said casing from said second inlet to said second outlet, a condenser mounted in said casing between said first outlet so as to be cooled by air flowing therebetween, and an evaporator mounted in said casing between said second inlet and said second outlet so as to cool air flowing therebetween.

5. The combination of claim 4 including a compressor and a compressor motor mounted in said casing above said condenser and beneath said second inlet, said first fan means being operative to pump some air from said second inlet over said compressor motor to said first outlet.

6. The combination of claim 4 wherein said second outlet is located immediately beneath said roof and is operative to direct cooled air longitudinally of the car along the ceiling of said roof.

References Cited by the Examiner
UNITED STATES PATENTS

| | | | |
|---|---|---|---|
| 1,926,767 | 9/33 | Furniss | 62—239 |
| 2,089,372 | 8/37 | Henney | 62—239 X |
| 2,104,383 | 1/38 | Candor et al. | 62—163 |
| 2,127,991 | 8/38 | Candor | 62—244 X |
| 2,128,021 | 8/38 | Smith | 62—244 X |
| 2,245,234 | 6/41 | Tanner | 62—450 X |
| 2,475,841 | 7/49 | Jones | 62—450 X |
| 2,737,787 | 3/56 | Kritzer | 62—448 X |
| 2,797,560 | 7/57 | Kooiker et al. | 62—279 X |

ROBERT A. O'LEARY, *Primary Examiner.*